US006657967B1

(12) United States Patent
Fujisawa et al.

(10) Patent No.: US 6,657,967 B1
(45) Date of Patent: Dec. 2, 2003

(54) DUMMY BIT ELIMINATION DEVICE AND CODING APPARATUS FOR FEC CODE WORD

(75) Inventors: Takanori Fujisawa, Tokyo (JP); Kenichi Nomura, Tokyo (JP); Yasushi Hara, Tokyo (JP); Norio Yanagi, Tokyo (JP); Hiroaki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/285,775

(22) Filed: Apr. 5, 1999

(30) Foreign Application Priority Data

Apr. 6, 1998 (JP) ............................................. 10-093273

(51) Int. Cl.[7] ........................... H04J 3/14; H03M 7/00; H03M 13/00; G06F 11/00
(52) U.S. Cl. ...................... 370/242; 370/543; 370/535; 341/59; 341/94; 359/115; 714/752; 714/776
(58) Field of Search ................................. 370/241, 242, 370/470, 474, 477, 521, 522, 523, 535; 341/50, 51, 59, 93, 94; 348/384, 845, 845.1; 359/109, 110, 115, 118; 714/746, 752, 774, 776

(56) References Cited

U.S. PATENT DOCUMENTS

| 3,700,820 A | | 10/1972 | Blasbalg et al. | ......... 179/15 BV |
|---|---|---|---|---|
| 4,755,993 A | | 7/1988 | Grover | .................... 370/110.1 |
| 4,972,417 A | * | 11/1990 | Sako et al. | ................. 371/37.4 |
| 5,144,304 A | * | 9/1992 | McMahon et al. | ............ 341/58 |
| 5,377,192 A | * | 12/1994 | Goodings et al. | .......... 370/95.3 |
| 5,574,717 A | * | 11/1996 | Tomizawa et al. | ............ 370/13 |
| 5,862,153 A | * | 1/1999 | Kikuchi et al. | ................ 371/42 |
| 6,249,895 B1 | * | 6/2001 | Kikuchi et al. | ............. 714/775 |

FOREIGN PATENT DOCUMENTS

| JP | 63-156447 | 6/1963 |
|---|---|---|
| JP | 9-146785 | 6/1997 |
| JP | 11-298447 | 10/1999 |
| JP | 2000-196567 | 7/2000 |

OTHER PUBLICATIONS

Japanese Office Action, dated Aug. 30, 2000, with English language translation of Japanese Examiner's comments.
European Patent Office Communication in corresponding EPO case.

* cited by examiner

Primary Examiner—Alpus H. Hsu
(74) Attorney, Agent, or Firm—Whitham, Curtis & Christofferson, PC

(57) ABSTRACT

A dummy bit elimination device in a coding apparatus for use in a submarine cable system. The dummy bit elimination device has a converter for eliminating only dummy bits from FEC (Forward Error Correction) code. The coding apparatus has an optical-to-electrical signal transducer, a demultiplexer, a coder for generating an FEC code, a multiplexer for multiplexing inputs, and an electrical-to-optical signal transducer. The dummy bit elimination device is inserted between the coder and the multiplexer so that the outputs of the coder are fed to the converter and an outputs of the converter are fed to the multiplexer.

5 Claims, 6 Drawing Sheets

FIG. 2

1ST STM1

| 1* | 2* | 3* | 4* | ... | 235* | 236* | 237* | 238* |

2ND STM1

| 1* | 2* | 3* | 4* | ... | 235* | 236* | 237* | 238* |

. . .

16TH STM1

| 1* | 2* | 3* | 4* | ... | 235* | 236* | 237* | 238* |

FIG. 3

FRAME 1: | OH* | 1*~238* DATA | 1*~16* PARITY | DUMMY* |

FRAME 2: | OH* | 1*~238* DATA | 1*~16* PARITY | DUMMY* |

FRAME 3: | OH* | 1*~238* DATA | 1*~16* PARITY | DUMMY* |

. . . . .

FRAME 16: | OH* | 1*~238* DATA | 1*~16* PARITY | DUMMY* |

F I G. 4 RELATED ART

| FRM 1 OH* | FRM 2 OH* | . . | FRM 16 OH* | FRM 1 1* | FRM 2 1* | . . | FRM 16 238* | FRM 1 PARITY 1* | FRM 2 PARITY 1* | . . . | FRM 16 PARITY 16* | FRM 1 DUMMY* | . . | FRM 15 DUMMY* | FRM 16 DUMMY* |

FIG. 5

OH* | 1* ~ 238* DATA | 1* ~ 16* PARITY

FIG. 6

| FRM 1 OH* | FRM 2 OH* | ... | FRM 16 OH* | FRM 1 1* | FRM 2 1* | ... | FRM 16 238* | FRM 1 PARITY 1* | FRM 2 PARITY 1* | ... | FRM 16 PARITY 16* |

DUMMY BIT ELIMINATION DEVICE AND CODING APPARATUS FOR FEC CODE WORD

BACKGROUND OF THE INVENTION

1. Field of the Invention

The present invention relates to a dummy bit elimination device for eliminating dummy bits added to an,FEC (Forward Error Correction) code which is transmitted on a submarine cable system.

2. Description of the Prior Art

In a submarine cable system, a processing device for generating FEC code, for example a Reed-Solomon code, based on an optical signal input adds the dummy bits to the FEC code to simplify the configuration thereof.

Adding the dummy bit according to a conventional method, however, increases a bit rate on the communication channel. A transmission loss is increased in accordance with the increased bit rate. Thus, for example, it was required to compensate the loss by increasing a number of repeaters.

SUMMARY OF THE INVENTION

An object of the present invention is to provide a dummy bit elimination device for eliminating the dummy bit added to the FEC code that is transmitted on the submarine cable system.

According to a first aspect of the present invention, there is provided a dummy bit elimination device included in a coding apparatus, which device comprises: means for eliminating only dummy bits from FEC code supplied thereto so as to output only the FEC Code; wherein the coding apparatus comprises: a means for converting an optical signal into an electrical signal data; a demultiplexer for demultiplexing the data; a coding means for generating an FEC (Forward Error Correction) code having the demultiplexed data and additional parities, and dummy bits for each of the demultiplexed data; a multiplexer for multiplexing inputs thereto; and a means for converting an output of the multiplexer into an optical signal; and wherein the dummy bit elimination device and an output of the dummy bit elimination device are fed to the multiplexer.

According to a second aspect of the present invention, there is provided a coding apparatus, which apparatus comprises: a means for converting an optical signal into an electric signal data; a demultiplexer for demultiplexing the data; a coding means for generating an FEC code having the demultiplexed data and additional parities, and dummy bits for each of demultiplexed data; a dummy bit eliminating means for eliminating only the dummy bits from outputs of the coding means so as to output only the FEC codes; a multiplexer for multiplexing outputs of the dummy bit eliminating means; and a means for converting an output of the multiplexer into an optical signal.

The coding apparatus may be combined with a submarine cable system.

According to a third aspect of the present invention, there is provided a coding apparatus which comprises: a coding means for continuously outputting an FEC code word having an input data and additional parities, and dummy bits to simplify an FEC coding; and a dummy bit eliminating means for eliminating only the dummy bits from a continuity consisting of the FEC code and the dummy bits so as to output only the FEC code.

BRIEF DESCRIPTION OF THE DRAWINGS

The present invention will be more fully understood from the following detailed description with reference to the accompanying drawings in which:

FIG. 2 is a diagram showing the output format of demultiplexer 2 in FIG. 1;

FIG. 3 is a diagram showing the output format of FEC coder 3 in FIG. 1;

FIG. 4 is a diagram showing the output format of multiplexer 5 in case that there is not provided a converter 4 shown in FIG. 1;

FIG. 5 is a diagram showing the output format of converter 4 in FIG. 1; and

FIG. 6 is a diagram showing the output format of multiplexer 5 in case that there is provided a converter 4 shown in FIG. 1.

DETAILED DESCRIPTION OF THE PREFERRED EMBODIMENTS

Figure 1:
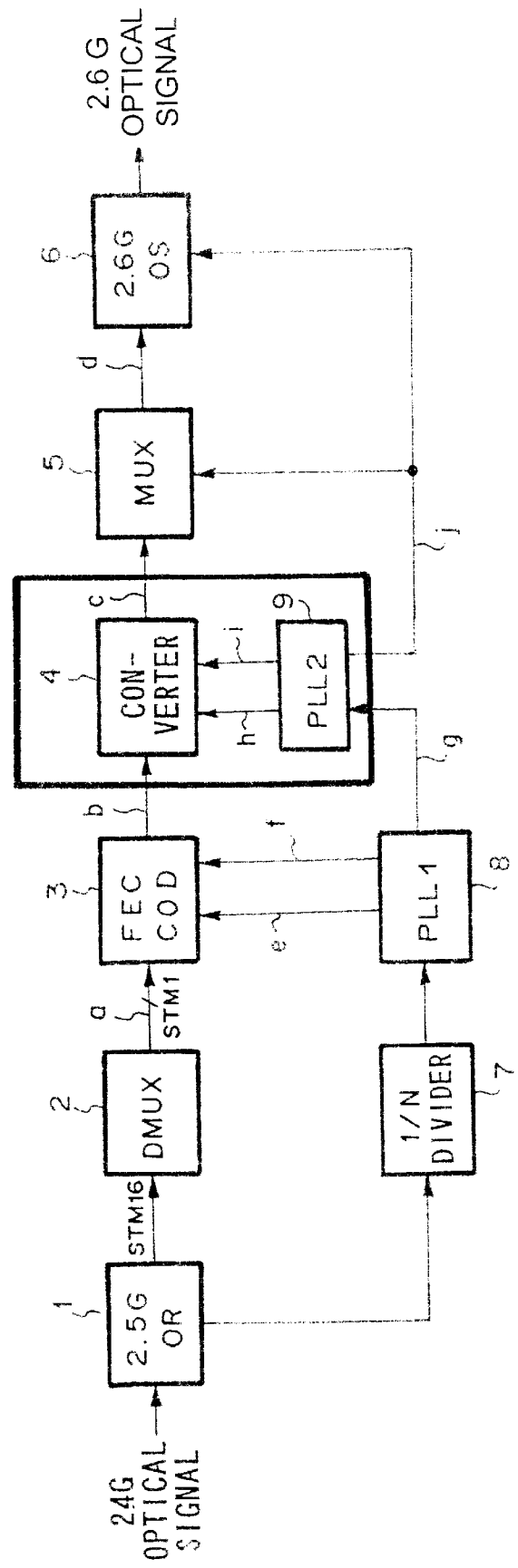
FIG. 1 is a block diagram showing a coding apparatus configuration including a dummy bit elimination device for the FEC code word according to the present invention.

FIG. 1 is a block diagram showing a coding apparatus configuration including a dummy bit elimination including a dummy bit elimination device according to an embodiment of the present invention. A 2.4G optical signal is fed into 2.5G optical receiver (2.5G OR) 1 and is output from 2.6G optical sender (2.6G OS) 6 as a 2.6G optical signal through demultiplexer (DMUX) 2, FEC coder (FEC COD) 3, converter 4 and multiplexer (MUX) 5. Clock signals, for activating the above circuits, generated at 2.5G optical receiver 1 and divided at 1/N divider 7 are supplied to FEC coder 3, converter 4, multiplexer 5 and 2.6G optical sender 6 through phase locked loops 8 and 9 (PLL1 and PLL20).

The 2.4G optical signal is converted at 2.5G optical receiver 1 into STM16 signal in a form of an electric signal and is then fed to demultiplexer 2. Demulitiplexer 2 separates STM16 signal into STM1 signals a as many as 16 and feeds them to FEC coder 3 in parallel.

FIG. 2 shows STM1 signals a as many as 16, each of which consists of 238 bytes data.

Each STM1 signal a is encoded at FEC coder 3 into an FEC COD output signal b which includes overhead bit OH, parity bits which form a part of the FEC code, and dummy bits as shown in FIG. 3.

According to the conventional method, FEC COD output signal b is fed into multiplexer 5 and become a multiplexed signal in multiplexer 5. FIG. 4 shows the multiplexed signal generated at mulitiplexer 5. In this case, the bit rate on the communication channel may be increased due to the dummy bits.

According to the embodiment, the FEC COD output signal b is fed into converter 4 for eliminating the dummy bits. Converter 4 outputs signal c not including the additional dummy bits as shown in FIG. 5. Signal c consists of overhead bits, data and parities but does not include the dummy bits as shown in the figure.

Signal c is processed at multiplexer 5 into multiplexed signal d shown in FIG. 6.

Multiplexed signal d is converted into the optical signal at 2.6G optical sender 6 and is sent out on the communication channel. 155 MHz clock signal extracted at 2.5G optical receiver 1 is fed to 1/N divider 7 and is divided into a long cycle signal of 81 KHz. 81 KHz signal is supplied to PLL 8 (PLL1). PLL 8 generates write clock e and read clock f of 166 MHz for use in FEC coder 3 for FEC process.

PLL 8 (PLL1) also sends 2.6G multiplexing clock g to PLL 9 (PLL2). PLL 9 regenerates 166 MHz clock from 2.6G clock g and feeds write clock h and read clock i to converter 4 for eliminating the dummy bits. A frequency of clock h is determined lower than that of clock g.

PLL 9 (PLL2) also supplies multiplexing clock j which synchronizes with clock i to multiplexer 5 and 2.6G optical sender 6. Thus, the multiplexed signal according to the present invention, from which the dummy bits are eliminated, may be generated.

Converter 4 and PLL 9 (PLL2) may be fabricated in one package IC. The IC may not be employed when the signal that includes the dummy bits is transmitted. In this case, signal b is directly fed into multiplexer 5 and 2.6G multiplexing clock g output from PLL 8 (PLL1) is directly fed to multiplexer 5 and 2.6G optical sender 6. A configuration to transmit dummy bits and another configuration not to transmit dummy bits may be alternated with a switching means.

According to the present invention, it is possible to eliminate dummy bits which are additionally output from the simplified FEC processor as explained above. Thus, the bit rate on the communication channel can be prevented from increasing.

In addition, according to the present invention, it is possible to generate the signal having no dummy bits while using the simplified FEC processor. Thus, the circuit scale of the whole coding apparatus for generating the signal having no dummy bits can be reduced.

Further, according to the present invention, the converter and PLL2 may be simply inserted into the conventional FEC processor. Thus, the conventional FEC processor may be appropriable Still further, according to the present invention, it is possible to easily alternate the configuration to transmit dummy bits and the configuration not to transmit dummy bits.

Having explained preferred embodiments of the present invention, it will now become apparent to those of ordinary skill in the art that other embodiments incorporated these concepts may be used. Accordingly, it is submitted that the invention should not be limited to the explained embodiments but rather should be limited only by the spirit and scope of the appended claims.

What is claimed is:

1. A coding apparatus, comprising:
   an optical receiver for converting an optical signal into an electric signal data and generating a clock signal;
   a demultiplexer for demultiplexing said electric signal data and outputting demultiplexed data in the form of plurality of demultiplexed signals;
   a coding means for generating a FEC (Forward Error Correction) code by adding to said demultiplexed data additional parity bits and dummy bits for each demultiplexed signal in said data;
   a dummy bit elimination device which eliminates dummy bits from said FEC coded signals; said dummy bit elimination device including:
   (i) a converter for eliminating only dummy bits from FEC code supplied thereto so as to output only said FEC code; and
   (ii) a Phase Locking Loop for regenerating said clock signal and feeding write and read clock signals to said converter;
   a multiplexer for multiplexing outputs from said dummy bit elimination device; and
   an optical sender for converting an output of said multiplexer into an optical signal;
   wherein said dummy bit elimination device is inserted between said coding means and said multiplexer so that the outputs of said coding means are fed to said dummy bit elimination device and outputs of said dummy bit elimination device are fed to said multiplexer.

2. The dummy bit elimination device according to claim 1, wherein said coding apparatus is combined in a submarine cable system.

3. A coding apparatus for use in a submarine cable system, which apparatus comprises:
   an optical receiver for converting an optical signal into an electric signal data and generating a clock signal;
   a demultiplexer for demultiplexing said data;
   a coding means for generating an FEC code having the demultiplexed data and additional parities, and dummy bits for each demultiplexed signal in the data;
   a dummy bit eleiminating means, comprising
      a converter for eliminating only said dummy bits from outputs of said coding means so as to output only said FEC codes, and
      a Phase Locking Loop for regenerating said clock signal and feeding write and read clock signals to said converter;
   a multiplexer for multiplexing outputs of said dummy eliminating means; and
   an optical sender for converting an output of said multiplexer into an optical signal.

4. The dummy bit elimination device according to claim 3, wherein said coding apparatus is combined in a submarine cable system.

5. A coding apparatus which comprises:
   an optical receiver for converting an optical signal into an electronic signal data;
   a demultiplexer for demultiplexing said electric signal data and outputting demultiplexed signals;
   a coding means for continuously outputting an FEC code word having one of said demultiplexed signals with additional parities, and dummy bits to simplify an FEC coding; and
   a dummy bit eliminating device, comprising:
   (i) a converter for eliminating only said dummy bits from a continuity consisting of said FEC code and said dummy bits so as to output only said FEC code and
   (ii) a Phase Locking Loop for providing a frequency control of clock signals supplied to said converter;
   a multiplexer for multiplexing outputs from said dummy bit elimination device; and
   an optical sender for converting an output of said multiplexer into an optical signal.

* * * * *